(12) United States Patent
Huang (10) Patent No.: US 8,717,782 B2
(45) Date of Patent: May 6, 2014

(54) SWEEPING FREQUENCY LLC RESONANT POWER REGULATOR

(75) Inventor: Fuen Huang, Shanghai (CN)

(73) Assignee: Texas Instruments Incorporated, Dallas, TX (US)

( * ) Notice: Subject to any disclaimer, the term of this patent is extended or adjusted under 35 U.S.C. 154(b) by 155 days.

(21) Appl. No.: 12/675,454

(22) PCT Filed: Jan. 7, 2009

(86) PCT No.: PCT/CN2009/000024
§ 371 (c)(1),
(2), (4) Date: Aug. 23, 2011

(87) PCT Pub. No.: WO2010/078694
PCT Pub. Date: Jul. 15, 2010

(65) Prior Publication Data
US 2011/0305044 A1    Dec. 15, 2011

(51) Int. Cl.
*H02M 3/335*  (2006.01)
*H02M 7/537*  (2006.01)
*H02M 7/5387* (2007.01)

(52) U.S. Cl.
USPC ......... 363/21.02; 363/16; 363/17; 363/21.03; 363/131; 363/132

(58) Field of Classification Search
USPC .............. 363/16, 17, 21.02–21.03, 131, 132
See application file for complete search history.

(56) References Cited

U.S. PATENT DOCUMENTS

| | | | |
|---|---|---|---|
| 4,559,590 A * | 12/1985 | Davidson | 363/21.02 |
| 5,838,558 A * | 11/1998 | Tan et al. | 363/91 |
| 6,344,979 B1 * | 2/2002 | Huang et al. | 363/16 |
| 6,392,902 B1 | 5/2002 | Jang et al. | |
| 8,107,262 B2 * | 1/2012 | Won et al. | 363/21.02 |
| 2002/0012257 A1 * | 1/2002 | Takahama et al. | 363/95 |
| 2002/0172061 A1 * | 11/2002 | Phadke | 363/127 |
| 2003/0205572 A1 | 11/2003 | Bassill et al. | |

(Continued)

FOREIGN PATENT DOCUMENTS

| | | |
|---|---|---|
| CN | 1368787 | 9/2002 |
| CN | 2914482 | 6/2007 |

(Continued)

OTHER PUBLICATIONS

Machine English translation of CN101106335A, published Jan. 16, 2008.

(Continued)

*Primary Examiner* — Timothy J Dole
*Assistant Examiner* — Yusef Ahmed
(74) *Attorney, Agent, or Firm* — William B. Kempler; Wade J. Brady III; Frederick J. Telecky, Jr.

(57) ABSTRACT

An LLC resonant power regulator system includes a transformer having a primary inductor and a secondary inductor and an input resonant tank including an input resonant capacitor, an input leakage inductor, and the primary inductor connected in series. The system also includes an input stage having a plurality of switches that are controlled in response to a respective plurality of switching signals sweeping frequency to supply an input resonant current to the input resonant tank. Each of the respective plurality of switching signals can have a fixed duty cycle and a sweeping frequency. The system further includes an output resonant tank that includes an output resonant capacitor, an output leakage inductor, and the secondary inductor connected in series. The output resonant tank can be configured to generate an oscillating output resonant current at an output.

18 Claims, 5 Drawing Sheets

(56) References Cited

U.S. PATENT DOCUMENTS

| | | | |
|---|---|---|---|
| 2005/0242789 A1* | 11/2005 | Kang | 323/224 |
| 2006/0062025 A1* | 3/2006 | Yasumura | 363/16 |
| 2006/0139970 A1* | 6/2006 | Cheng | 363/24 |
| 2007/0171680 A1* | 7/2007 | Perreault et al. | 363/16 |
| 2008/0151580 A1* | 6/2008 | Schlecht | 363/16 |
| 2008/0247194 A1* | 10/2008 | Ying et al. | 363/17 |
| 2009/0284991 A1* | 11/2009 | Nishikawa | 363/21.02 |

FOREIGN PATENT DOCUMENTS

| | | |
|---|---|---|
| CN | 101001495 | 7/2007 |
| CN | 101106335 | 1/2008 |
| CN | 100424975 | 10/2008 |
| CN | 101001495 | 5/2010 |
| WO | WO2006103606 | 10/2006 |

OTHER PUBLICATIONS

Chinese Office Action (dated Jul. 3, 2013) for Chinese Patent Application No. 200880129504.6

English Translation of Chinese Office Action (dated Jul. 3, 2013) for Chinese Patent Application No. 200880129504.6

Machine English translation of CN101001495, published May 12. 2010.

* cited by examiner

SWEEPING FREQUENCY LLC RESONANT POWER REGULATOR

TECHNICAL FIELD

This invention relates to electronic circuits, and more particularly to a sweeping frequency LLC resonant power regulator.

BACKGROUND

There is an increasing demand for power conversion and regulation circuitry to operate with increased efficiency and reduced power dissipation to accommodate the continuous reduction in size of electronic devices. Switching regulators have been implemented as an efficient mechanism for providing a regulated output in power supplies. One such type of regulator is known as a switching regulator or switching power supply, which controls the flow of power to a load by controlling the on and off duty-cycle of one or more switches coupled to the load. Many different classes of switching regulators exist today.

As a further example, a resonant power regulator can be configured with a resonant tank that conducts an oscillating resonant current based on a power storage interaction between a capacitor and an inductor, such as in a primary inductor of a transformer. The oscillating resonant current can be generated based on the operation of the switches, and can thus induce a current in a secondary inductor of the transformer. Therefore, an output voltage can be generated based on the output current. Resonant power regulators can be implemented to achieve very low switching loss, and can thus be operated at substantially high switching frequencies.

SUMMARY

One embodiment of the invention includes an LLC resonant power regulator system. The system includes a transformer comprising a primary inductor and a secondary inductor and an input resonant tank comprising an input resonant capacitor, an input leakage inductor, and the primary inductor connected in series. The system also includes an input stage comprising a plurality of switches that are controlled in response to a respective plurality of switching signals sweeping frequency to supply an input resonant current to the input resonant tank. Each of the respective plurality of switching signals can have a fixed duty cycle and a sweeping frequency. The system further comprises an output resonant tank comprising an output resonant capacitor, an output leakage inductor, and the secondary inductor connected in series. The output resonant tank can be configured to generate an oscillating output resonant current at an output.

Another embodiment of the invention includes a method for providing AC power via an LLC resonant power regulator. The method includes generating a plurality of switching signals having a substantially fixed 50% duty-cycle and a sweeping frequency. The method also includes controlling a plurality of switches in response to the respective plurality of switching signals to provide an input resonant current to an input resonant tank, the input resonant tank comprising an input resonant capacitor, an input leakage inductor, and a primary inductor of a transformer. The method also includes inducing an output resonant current through a secondary inductor of the transformer in response to the input resonant current, the output resonant current resonating through an output resonant tank that includes the secondary inductor of the transformer. The method further includes conducting the output resonant current as an AC current through a load. The load can be coupled in series with the output resonant tank.

Another embodiment of the invention includes an LLC resonant power regulator system. The system includes means for generating a plurality of switching signals having a substantially fixed duty-cycle and a sweeping frequency having a predefined and means for alternately coupling a control node between an input voltage and a reference voltage rail in response to the plurality of switching signals. The system also includes means for resonating an input resonant current in response to voltage changes at the control node. The means for resonating can have a first resonant frequency and a second resonant frequency that are defined by circuit component characteristics of the means for resonating. The system further includes means for sensing a magnitude of the output resonant current and means for regulating a frequency of the plurality of switching signals to within the sweeping frequency predefined range based on the magnitude of the output resonant current relative to a predetermined reference magnitude.

DETAILED DESCRIPTION

The invention relates to electronic circuits, and more particularly to a fixed duty-cycle LLC resonant power regulator. The LLC resonant power regulator can include a transformer having a primary inductor and a secondary inductor. An input resonant tank, which includes the primary inductor, can have a first resonant frequency and a second resonant frequency based on the circuitry components thereof. Therefore, a resonant current is generated in the input resonant tank, which thus induces an output current in the secondary inductor to an output stage. The output stage can also include an output resonant tank formed at least in part by the secondary inductor of the transformer. The output resonant current can thus oscillate through a load that is coupled in series with the output resonant tank.

The input resonant power regulator can also include an input stage having a half-bridge arrangement of switches, such as transistors (e.g., metal-oxide semiconductor field effect transistors (MOSFETs)). The half-bridge arrangement can include a node that is coupled to drive the input resonant tank based on a set of switching signals. The switching signals can be provided at a sweeping frequency and have a fixed duty-cycle. As described herein, a sweeping frequency is a frequency that is variable between a first frequency and a second, greater frequency, such that the frequency can oscillate between the first and second frequencies or can be regulated between the first and second frequencies. The switching signals can be have an approximately 50% duty cycle, and can be approximately 180° out-of-phase relative to each other. Therefore, the switches can be activated and deactivated to generate the input resonant current based on alternately coupling the input resonant tank to a high voltage rail and a low voltage rail.

The sweeping frequency range of the switching signals can be selected to be greater than at least one of the first resonant frequency and the second resonant frequency such that the MOSFETs are activated in a zero voltage switching (ZVS) manner. Therefore, the operation of the switches in the input stage can be more efficient than in typical resonant power regulators. In addition, based on the switching signals having an approximately 50% duty cycle and being approximately 180° out-of-phase relative to each other, the LLC resonant power regulator system can operate with substantially mitigated total harmonic distortion (THD). Furthermore, the magnitude of the output resonant current can be monitored and compared with a reference magnitude. Accordingly, the frequency of the switching signals can be regulated within the sweeping frequency range based on the comparison.

Figure 1:
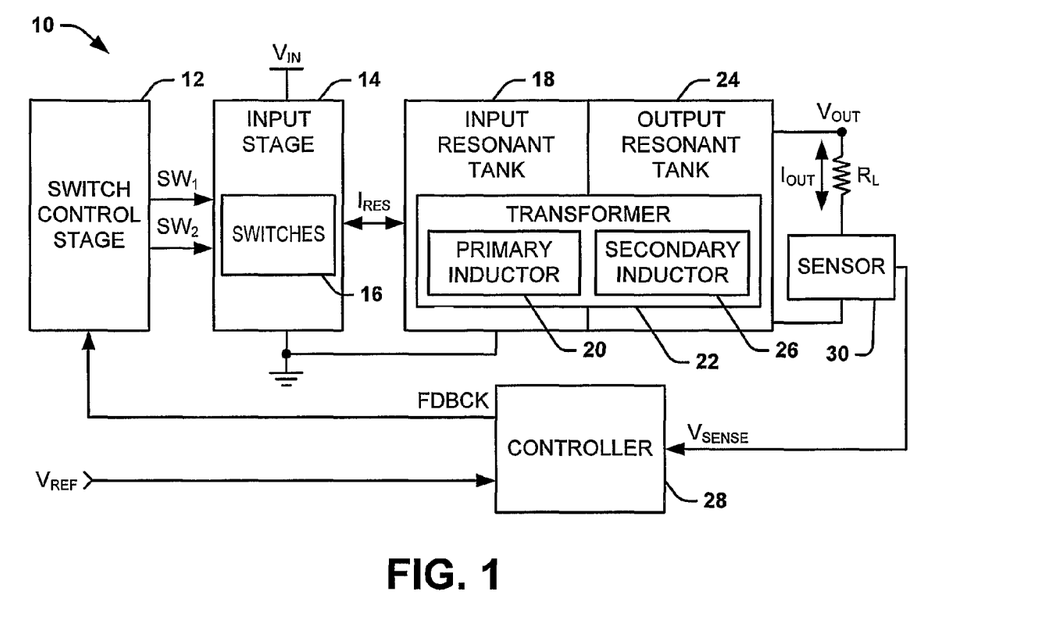
FIG. 1 illustrates an example of an LLC resonant power regulator system in accordance with an aspect of the invention.

FIG. 1 illustrates an example of an LLC resonant power regulator system 10 in accordance with an aspect of the invention. The LLC resonant power regulator system 10 is configured to generate an AC output resonant current $I_{OUT}$ that oscillates through a load, demonstrated as $R_L$, based on an input voltage $V_{IN}$. While the load is demonstrated as a resistive load, it will be understood that the load may also include other types of impedance depending on application requirements for the system. The LLC resonant power regulator system 10 can be implemented in a variety of applications, such as in any of a variety of portable electronic devices. For example, the LLC resonant power regulator system 10 can be utilized as an inverter that provides power to one or more cold cathode fluorescent lamps (CCFL), such as for a computer monitor.

The LLC resonant power regulator system 10 includes a switching control stage 12 configured to generate a plurality of switching signals. In the example of FIG. 1, the switching signals are demonstrated as a pair of switching signals $SW_1$ and $SW_2$. The LLC resonant power regulator system 10 also includes an input stage 14 that is interconnected between a high voltage rail, demonstrated as the input voltage $V_{IN}$, and a low voltage rail, demonstrated as ground. The input stage 14 includes a plurality of switches 16 that are controlled by the switching signals $SW_1$ and $SW_2$. As an example, the switches 16 can be configured in a half-bridge arrangement coupled between voltage rails. For instance, the switches 16 include a pair of switches interconnected between the rails by a control node. The control node can be an output node of the input stage 14 that supplies current to an input resonant tank 18 according to activation and deactivation of the switches 16.

The input resonant tank 18 is configured to conduct an input resonant current $I_{RES}$ in response to the operation of the switches 16. In the example of FIG. 1, the input resonant tank 18 includes a primary inductor 20 of a transformer 22, such that the input resonant current $I_{RES}$ can flow through the primary inductor 20 of the transformer 22 as well as, for example, a leakage inductor and a resonant capacitor connected together in series. Thus, the input resonant tank 18 can have a first resonant frequency that is defined by the characteristics associated with the leakage inductor and the resonant capacitor, and can have a second resonant frequency that is defined by the characteristics associated with the leakage inductor, the primary inductor, and the resonant capacitor. The first resonant frequency can be greater than the second resonant frequency.

As an example, the input resonant tank 18 can be interconnected between the interconnecting control node in the input stage 14 and ground. The switching signals $SW_1$ and $SW_2$ can have a fixed duty-cycle. As an example, the fixed duty-cycle can be approximately 50%. In addition, the switching signals $SW_1$ and $SW_2$ can be out-of-phase by approximately 180° relative to each other, such that they can be mutually exclusively asserted (i.e., logic-high) and de-asserted (i.e., logic-low). Therefore, the switches 16 can be operated by the switching signals $SW_1$ and $SW_2$ to alternately couple the input resonant tank 18 to the input voltage $V_{IN}$ and to ground. Accordingly, the input resonant current $I_{RES}$ can resonate through the input resonant tank 18 at the first resonant frequency and the second resonant frequency based on the activation/deactivation sequence of the switches 16. In addition, the switches 16 can be operated by providing the switching signals $SW_1$ and $SW_2$ with a sweeping frequency, such that the switches 16 are activated and deactivated within a sweeping frequency range. As an example, the sweeping frequency range can be set to be greater than one or both of the first resonant frequency and second resonant frequency of the input resonant tank 18. In this way, the switches 16 can be activated in a zero voltage switching (ZVS) manner for more efficient operation of the LLC resonant power regulator system 10.

The LLC resonant power regulator system 10 also includes an output resonant tank 24. In the example of FIG. 1, the output resonant tank 24 can include a secondary inductor 26 of the transformer 22. In response to the oscillation of the input resonant current $I_{RES}$ through the primary inductor of the transformer 22, the secondary inductor 26 of the transformer 22 generates an output resonant current $I_{OUT}$ (e.g., based on a magnetic flux through the core of the transformer 22). The output resonant tank 24 is configured to conduct the output resonant current $I_{OUT}$ in response to the input resonant current $I_{RES}$, such that the output resonant current $I_{OUT}$ can flow through the secondary inductor 26 of the transformer 22 as well as, for example, a leakage inductor and a resonant capacitor connected together in series with the load $R_L$. Accordingly, the output resonant current $I_{OUT}$ is provided as an AC current that oscillates through the load $R_L$.

The LLC resonant power regulator system 10 further includes a feedback controller 28 configured to monitor a magnitude of the output resonant current $I_{OUT}$. For instance, the feedback controller 28 monitors a voltage $V_{SENSE}$ that is generated from a sensor 30 that is coupled in series with the load $R_L$. As an example, the sensor 30 can be implemented as a sense resistor or other current sensing device (e.g., Hall-effect sensor) that provides sensor signal $V_{SENSE}$ indicative of (e.g., proportional to) the magnitude of the output resonant current $I_{OUT}$. The feedback controller 28 can be configured to compare the voltage $V_{SENSE}$ with a predetermined reference voltage $V_{REF}$ and provide a feedback signal FDBCK to the switch control stage 12. For instance, the feedback controller can be implemented as an error amplifier that provides the feedback signal FDBCK corresponding to a difference in magnitude between the voltage $V_{SENSE}$ and the predetermined reference voltage $V_{REF}$. Accordingly, the switch control stage 12 can regulate the frequency of the switching signals $SW_1$ and $SW_2$ in response to the feedback signal FDBCK. For example, the switch control stage 12 can sweep the frequency of the switching signals $SW_1$ and $SW_2$ through the sweeping frequency range based on the oscillating magnitude of the output resonant current $I_{OUT}$.

Based on the regulation of frequency of the switching signals $SW_1$ and $SW_2$, the LLC resonant power regulator system 10 can operate with improved efficiency. As described above, because the sweeping frequency range of the switching signals $SW_1$ and $SW_2$, and thus the operation of the switches 16 is greater than one or both of the first and second resonant frequencies, the switches 16 can operate in the ZVS manner. Accordingly, the switches 16 are soft-switched to result in more power efficient operation with substantially less electromagnetic interference (EMI) than typical LLC power regulators. In addition, regulation of the frequency of the switching signals $SW_1$ and $SW_2$ to within a narrow frequency range of the sweeping frequency can result in the 50% fixed duty-cycle of the switching signals $SW_1$ and $SW_2$ for the mutually exclusive activation and deactivation of the switches 16. Therefore, the operation of the switches 16 in response to the switching signals $SW_1$ and $SW_2$ can result in a substantial reduction in total harmonic distortion (THD) relative to many existing LLC power regulators.

Figure 2:
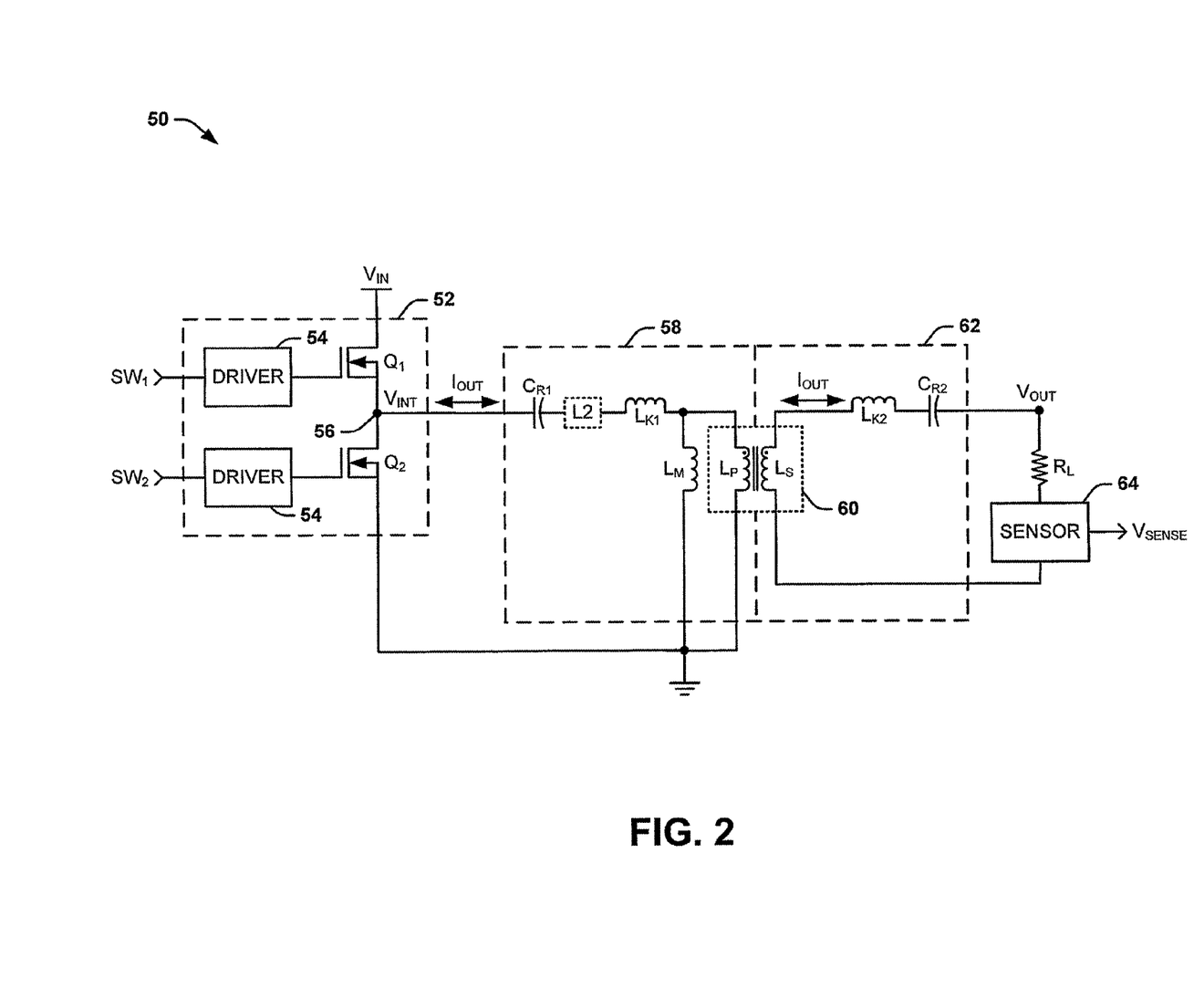
FIG. 2 illustrates another example of an LLC resonant power regulator system in accordance with an aspect of the invention.

FIG. 2 illustrates another example of an LLC resonant power regulator system 50 in accordance with an aspect of the invention. Similar to as described above in the example of FIG. 1, the LLC resonant power regulator system 50 is configured to generate an output resonant (AC) current $I_{OUT}$ oscillating through a load $R_L$ based on an input voltage $V_{IN}$. As an example, the input voltage $V_{IN}$ can be approximately 350 to 450 VDC to result in a range of the output voltage $V_{OUT}$ across the load $R_L$ of between approximately 1000 to 2000 VDC during typical operation of the LLC resonant power regulator system 50.

The LLC resonant power regulator system 50 includes an input stage 52 that is interconnected between a high voltage rail, demonstrated as the input voltage $V_{IN}$, and a low voltage rail, demonstrated as ground. The input stage 52 includes a plurality of switches, demonstrated in the example of FIG. 2 as MOSFETs $Q_1$ and $Q_2$ that are controlled, respectively, by switching signals $SW_1$ and $SW_2$ via drivers 54. In the example of FIG. 2, the MOSFET $Q_1$ is coupled to the input voltage $V_{IN}$, the MOSFET $Q_2$ is coupled to ground, and the MOSFETs $Q_1$ and $Q_2$ are interconnected in series by a control node 56 having a voltage $V_{INT}$. Therefore, the MOSFETs $Q_1$ and $Q_2$ are arranged as a half-bridge.

In the example of FIG. 2, the LLC resonant power regulator system 50 also includes an input resonant tank 58 configured to conduct an input resonant current $I_{RES}$ in response to the activation and deactivation of the MOSFETs $Q_1$ and $Q_2$. In the example of FIG. 2, the input resonant tank 58 includes a magnetizing inductor $L_M$ associated with a transformer 60, a leakage inductor $L_{K1}$, and a resonant capacitor $C_{R1}$ that are coupled in series between the control node 56 and ground. It is to be understood that, in the example of FIG. 2, the magnetizing inductor LM represents a reactance of the primary inductor $L_P$ of the transformer 60 according to an ideal transistor model. The input resonant current $I_{RES}$ can therefore flow and resonate through the input resonant tank 58 in response to the activation and deactivation of the MOSFETs $Q_1$ and $Q_2$. The input resonant tank 58 has a first resonant frequency fr1 that is defined by the characteristics associated with the leakage inductor $L_{K1}$ and the resonant capacitor $C_{S1}$ as follows:

$$fr1 = \frac{1}{2*\pi*\sqrt{L_{K1}*C_{R1}}} \quad \text{Equation 1}$$

Where:
$L_{K1}$ is the inductance of the leakage inductor $L_{K1}$; and
$C_{R1}$ is the capacitance of the resonant capacitor $C_{R1}$.

The input resonant tank 58 also has a second resonant frequency fr2 that is defined by the characteristics associated with the leakage inductor $L_{K1}$, the magnetizing inductor $L_M$, and the resonant capacitor $C_{R1}$ as follows:

$$fr2 = \frac{1}{2*\pi*\sqrt{(L_{K1}+L_M)*C_{R1}}} \quad \text{Equation 2}$$

Where: $L_M$ is the inductance of the magnetizing inductor $L_M$.

Therefore, Equations 1 and 2 demonstrate that the first resonant frequency fr1 is greater than the second resonant frequency fr2.

The input resonant current $I_{RES}$ is generated based on the switching signals $SW_1$ and $SW_2$ provided to the gates of the MOSFETs $Q_1$ and $Q_2$. The switching signals $SW_1$ and $SW_2$ can have a sweeping frequency control and a fixed duty-cycle, such as to activate and deactivate MOSFETs $Q_1$ and $Q_2$ 180° out of phase relative to each other. Therefore, the MOSFETs $Q_1$ and $Q_2$ alternately couple the input resonant tank 58 to the input voltage $V_{IN}$ and to ground, such that the voltage $V_{INT}$ can be sequentially switched between zero and the input voltage $V_{IN}$ according to the sweeping frequency of the switching signals. Accordingly, the input resonant current $I_{RES}$ can alternate at resonating through the input resonant tank 58 at each of the first resonant frequency fr1 and the second resonant frequency fr2 based on the activation/deactivation sequence of the MOSFETs $Q_1$ and $Q_2$.

The LLC resonant power regulator system 50 also includes an output resonant tank 62 configured to conduct an output resonant current $I_{OUT}$. In response to the oscillation of the input resonant current $I_{RES}$ through the primary inductor $L_P$ of the transformer 60, a secondary inductor $L_S$ of the transformer 60 generates the output resonant current $I_{OUT}$ based on the magnetic flux through the core of the transformer 60. In the example of FIG. 2, the output resonant tank 62 includes an output leakage inductor $L_{K2}$ and an output resonant capacitor $C_{R2}$ that are coupled in series with the secondary inductor $L_S$ and the load $R_L$. Therefore, the output resonant current $I_{OUT}$ oscillates as an AC current through the load $R_L$. In addition, a sensor 64 is coupled to sense the output resonant current $I_{OUT}$, such as by measuring the current through the load $R_L$. The sensor 64, for example, can be configured to generate a voltage $V_{SENSE}$ that is proportional to the output resonant current $I_{OUT}$. Thus, $V_{SENSE}$ can be monitored to regulate the frequency of the switching signals $SW_1$ and $SW_2$, similar to as described above in the example of FIG. 1

Similar to as described above in the example of FIG. 1, based on the regulation of frequency of the switching signals $SW_1$ and $SW_2$, the LLC resonant power regulator system 50 can operate with improved efficiency. As described above, because the sweeping frequency range of the switching signals $SW_1$ and $SW_2$, and thus the operation of the MOSFETs $Q_1$ and $Q_2$ is greater than one or both of the first and second resonant frequencies fr1 and fr2, the MOSFETs $Q_1$ and $Q_2$ are operated in the ZVS manner. Accordingly, the MOSFETs $Q_1$ and $Q_2$ are soft-switched to result in more power efficient operation with substantially less EMI than typical LLC power regulators. In addition, regulation of the frequency of the switching signals $SW_1$ and $SW_2$ to within a narrow frequency range of the sweeping frequency can result in the 50% fixed duty-cycle of the switching signals $SW_1$ and $SW_2$ for the mutually exclusive activation and deactivation of the MOSFETs $Q_1$ and $Q_2$. Therefore, the operation of the MOSFETs $Q_1$ and $Q_2$ in response to the switching signals $SW_1$ and $SW_2$ can result in a substantial reduction in THD relative to other LLC power regulators.

It is to be understood that the LLC resonant power regulator system 50 is not intended to be limited to the example of FIG. 2. For example, in situations where it becomes desired to increase the regulated sweeping frequency range for the system, the input resonant tank 58 can include one or more additional inductors, indicated schematically as L2, which is shown connected in series with the leakage inductor $L_{K1}$ and the capacitor $C_{R1}$. Additionally, the LLC resonant power regulator system 50 is not limited to implementing MOSFETs, but could instead use one of a variety of other types of transistors instead of the MOSFETs $Q_1$ and $Q_2$. Accordingly, those skilled in the art will understand and appreciate that the LLC resonant power regulator system 50 can be configured in any of a variety of ways based on the teachings herein.

Figure 3:
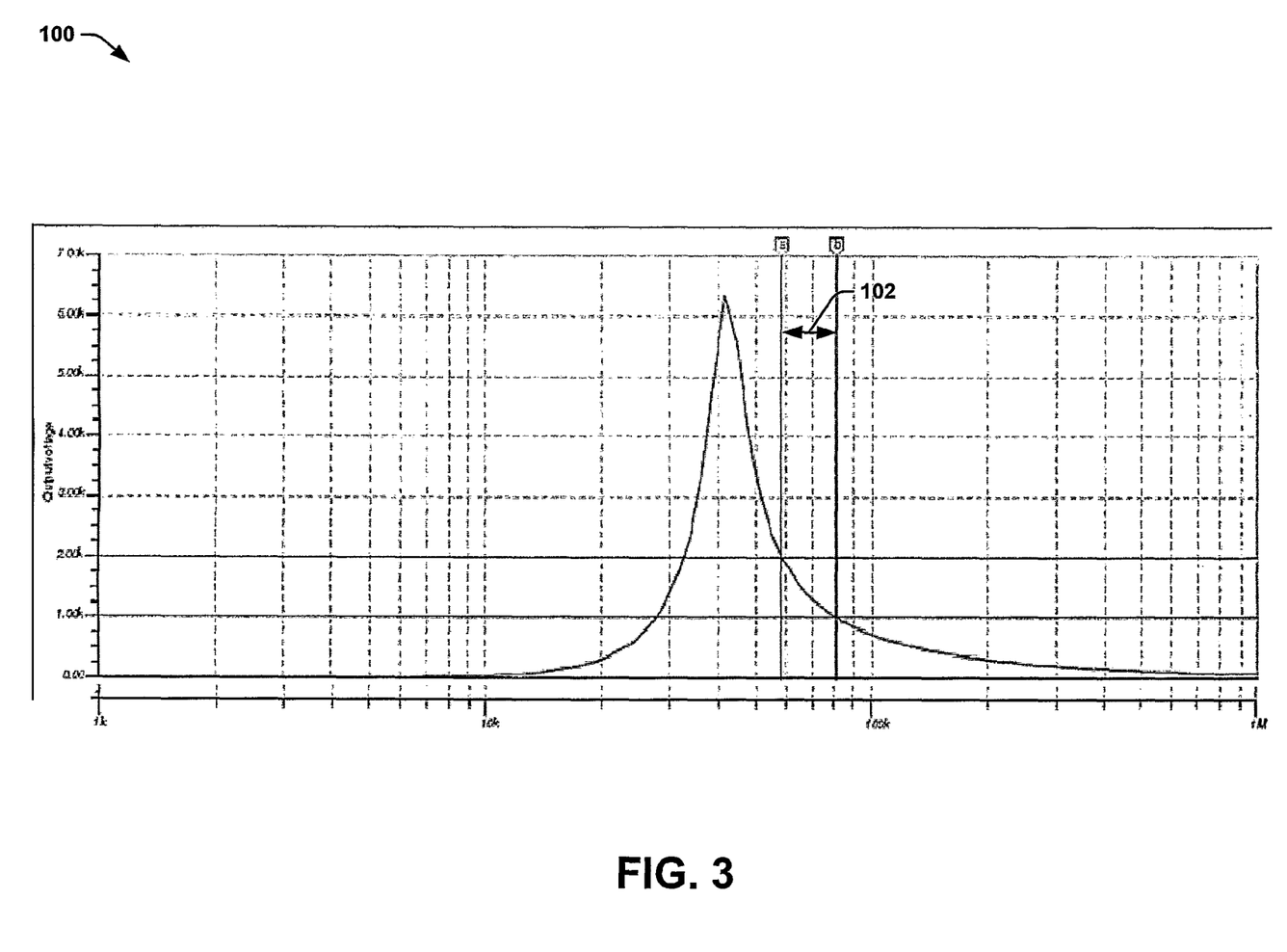
FIG. 3 illustrates an example of a graph of output voltage and a graph of phase difference as a function of the switching frequency in accordance with an aspect of the invention.

FIG. 3 illustrates an example of a graph 100 of output voltage as a function of the switching frequency in accordance with an aspect of the invention. The graph 100 can correspond to the LLC resonant power regulator system 50 in the example of FIG. 2. Therefore, reference is to be made to the example of FIG. 2 in the following description of the example of FIG. 3. The graph 100 can correspond to the LLC resonant power regulator system 50 having specific circuit characteristics. For example, the input voltage $V_{IN}$ can be approximately 385VDC, the transformer 60 can have a ratio of turns of the secondary inductor $L_S$ relative to the primary inductor $L_P$ of approximately 3.5, the input leakage inductor LK1 can have a magnitude of approximately 100 μH, the magnetizing inductor LM has a magnitude of approximately 600 μH, the input resonant capacitor CS1 has a magnitude of approximately 22 nF. The output leakage inductor LK2 can have a magnitude of approximately 150 mH, the output resonant capacitor CS2 has a magnitude of approximately 120 pF, and the load $R_L$ has a magnitude of approximately 50 kΩ.

The graph 100 demonstrates the output voltage $V_{OUT}$ as a function of the frequency of the switching signals $SW_1$ and $SW_2$. In the example of FIG. 3, the graph 100 demonstrates that the output voltage $V_{OUT}$ has a maximum gain at approximately 42 kHz, such as to achieve an output voltage $V_{OUT}$ of approximately 6250 VDC. For example, the frequency at which the LLC resonant power regulator system 50 achieves peak gain can be approximately equal to one of the first and second resonant frequencies of the input resonant tank 58. As an example, the LLC resonant power regulator system 50 can initially set the switching signals $SW_1$ and $SW_2$ to have a fixed 50% duty-cycle and a sweeping frequency to be near this peak gain magnitude, such as prior to striking a CCFL load $R_L$. Thus, subsequent to the striking of the CCFL load $R_L$, the LLC resonant power regulator system 50 can set the switching signals $SW_1$ and $SW_2$ to have the substantially fixed 50% duty-cycle and a sweeping frequency range that is substantially greater to maintain the output resonant current $I_{OUT}$ through the CCFL load $R_L$ subsequent to striking the CCFL load $R_L$. The example of FIG. 3 demonstrates a sweeping frequency range 102 of between approximately 58.6 kHz and 81 kHz, thus corresponding to an output sine waveform having a voltage magnitude of between approximately 1000 volts and approximately 2000 volts depending on the switching frequency. It will be appreciated that the lower end of this frequency range is greater than the first and/or second resonant frequency range of the input resonant tank for the example values mentioned herein. Therefore, the LLC resonant power regulator system 50 can regulate the frequency of the switching signals $SW_1$ and $SW_2$ to be within this sweeping frequency range to maintain ZVS activation of the MOSFETs Q1 and Q2.

Figure 4:
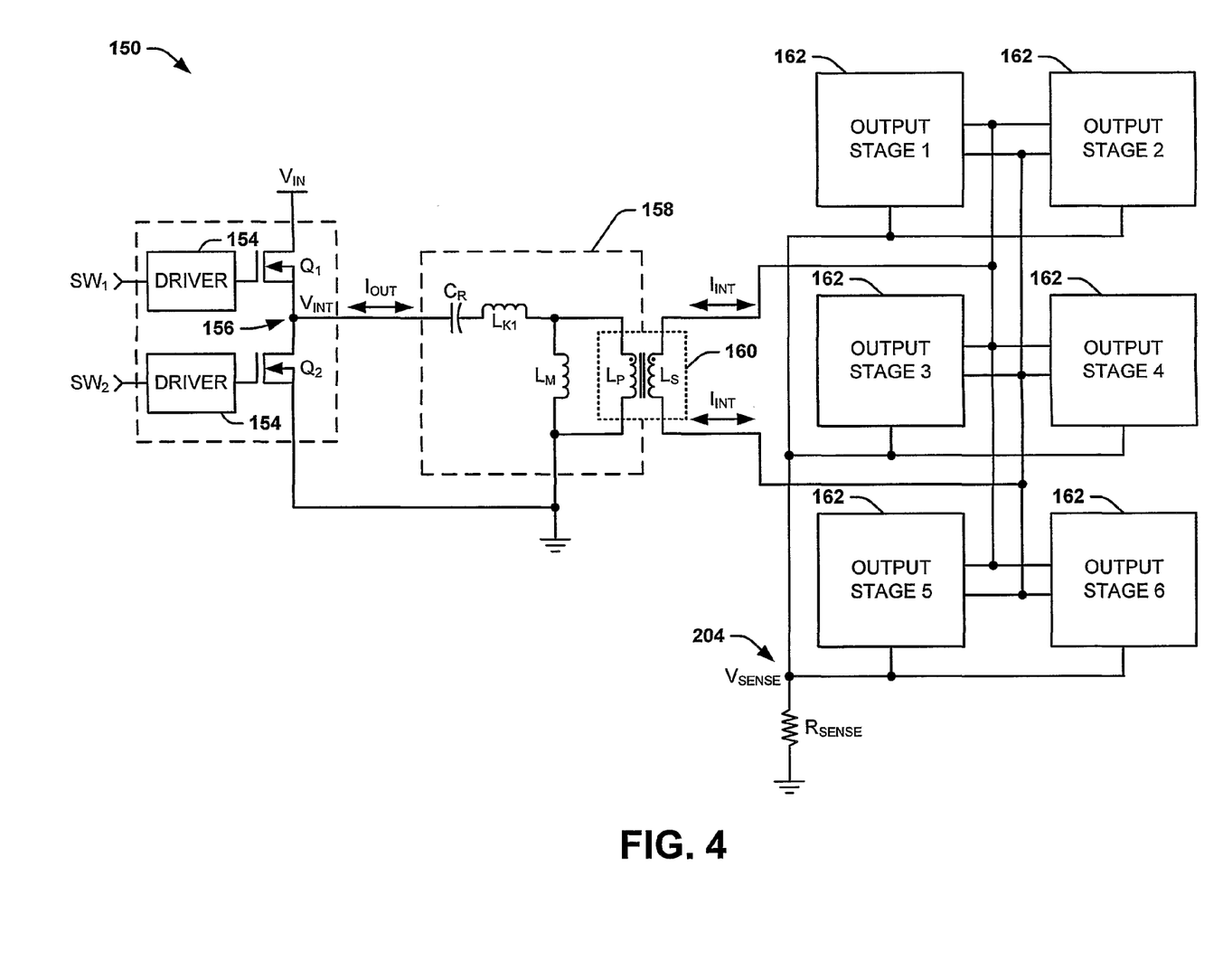
FIG. 4 illustrates yet another example of an LLC resonant power regulator system in accordance with an aspect of the invention.

FIG. 4 illustrates yet another example of an LLC resonant power regulator system 150 in accordance with an aspect of the invention. Similar to as described above in the example of FIG. 1, the LLC resonant power regulator system 50 is configured to generate an output resonant current $I_{OUT}$ oscillating through a load $R_L$ based on an input voltage $V_{IN}$. As an example, the input voltage $V_{IN}$ can be approximately 350 to 450 VDC to result in a range of the output voltage $V_{OUT}$ across the load $R_L$ of between approximately 1000 to 2000 volts during typical operation of the LLC resonant power regulator system 150 given similar switching frequencies.

Similar to as described above in the example of FIG. 2, the LLC resonant power regulator system 150 includes an input stage 152 that is interconnected between the input voltage $V_{IN}$ and ground. The input stage 152 includes the MOSFETs $Q_1$ and $Q_2$ that are controlled, respectively, by the switching signals $SW_1$ and $SW_2$ via drivers 154. In the example of FIG. 4, the MOSFET $Q_1$ is coupled to the input voltage $V_{IN}$, the MOSFET $Q_2$ is coupled to ground, and the MOSFETs $Q_1$ and $Q_2$ are interconnected in series by a control node 156 having a voltage $V_{INT}$. Therefore, the MOSFETs $Q_1$ and $Q_2$ are arranged as a half-bridge.

In the example of FIG. 4, the LLC resonant power regulator system 150 also includes an input resonant tank 158 configured to conduct an input resonant current $I_{RES}$ in response to the activation and deactivation of the MOSFETs $Q_1$ and $Q_2$. In the example of FIG. 4, the input resonant tank 158 includes a magnetizing inductor $L_M$ associated with a transformer 160, a leakage inductor $L_{K1}$, and a resonant capacitor $C_{R1}$ that are coupled in series between the control node 154 and ground. It is to be understood that, in the example of FIG. 4, the magnetizing inductor LM is associated with an ideal model of the transformer 160, such that the magnetizing inductor LM corresponds to a reactance of the primary inductor $L_P$ of the transformer 160. The input resonant current $I_{RES}$ can therefore flow and resonate through the input resonant tank 158 in response to the activation and deactivation of the MOSFETs $Q_1$ and $Q_2$, similar to as described above in the example of FIG. 2.

The switching signals $SW_1$ and $SW_2$ can have sweeping frequency control and a fixed duty-cycle, and can be asserted and de-asserted in a 180° relationship relative to each other. Therefore, the MOSFETs $Q_1$ and $Q_2$ can be mutually exclusively activated and deactivated by the switching signals $SW_1$ and $SW_2$ to alternately couple the input resonant tank 158 to the input voltage $V_{IN}$ and to ground, such that the voltage $V_{INT}$ can be alternate between zero and the input voltage $V_{IN}$. Accordingly, the input resonant current $I_{RES}$ can alternate at resonating through the input resonant tank 158 at each of the first resonant frequency fr1 and the second resonant frequency fr2 based on the activation/deactivation sequence of the MOSFETs $Q_1$ and $Q_2$.

The LLC resonant power regulator system 150 also includes a plurality of output stages 162, demonstrated in the example of FIG. 4 as OUTPUT STAGE 1 through OUTPUT STAGE N, where N is a positive integer. It is to be understood that the LLC resonant power regulator system 150 is not limited to any number of output stages 162, but can include any number of two or more output stages 162. In response to the oscillation of the input resonant current $I_{RES}$ through the primary inductor $L_P$ of the transformer 60, an intermediate current $I_{INT}$ oscillates through a secondary inductor $L_S$ of the transformer 160 based on the magnetic flux through the core of the transformer 160. The intermediate current $I_{INT}$ is thus provided to each of the output stages 162.

Figure 5:
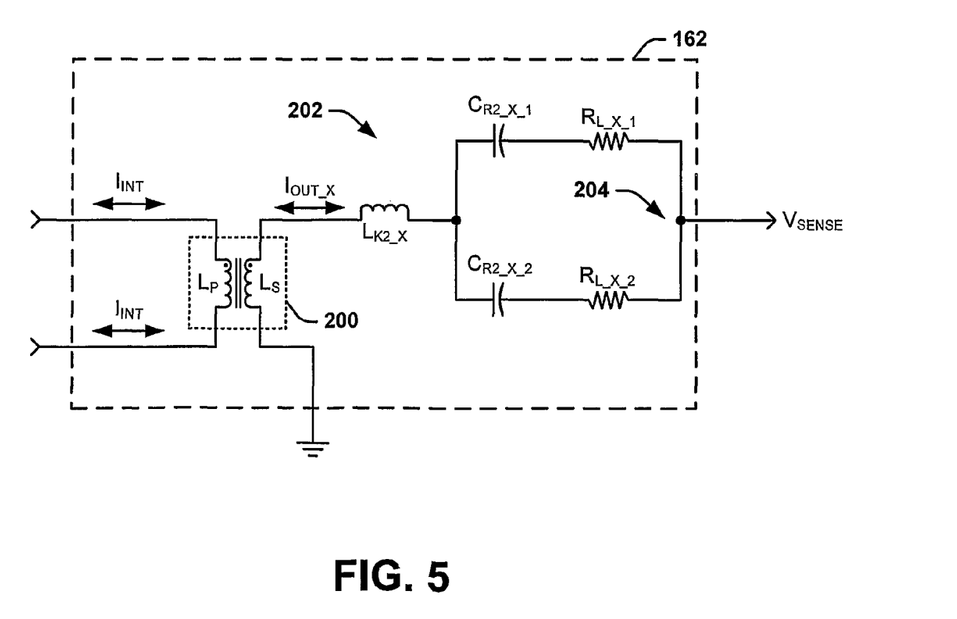
FIG. 5 illustrates an example of an output stage of an LLC resonant power regulator system in accordance with an aspect of the invention.

FIG. 5 illustrates an example of an output stage 162 of the LLC resonant power regulator system 150 in accordance with an aspect of the invention. Because the output stage 162 corresponds to the LLC resonant power regulator system 150 in the example of FIG. 4, reference is to be made to the example of FIG. 4 in the following description of the example of FIG. 5.

The output stage 162 includes a transformer 200 having a primary inductor $L_p$ through which the intermediate current $I_{INT}$ oscillates. Therefore, an output resonant current $I_{OUT\_X}$ is induced in a secondary inductor $L_S$, where X corresponds to the respective number of the output stage 162. The output stage 162 also includes a leakage inductor $L_{K2\_X}$ and a pair of parallel RC circuit portions that include capacitors $C_{S2\_X\_1}$ and $C_{S2\_X\_2}$ that are each coupled in series with respective loads, demonstrated as $R_{L\_X\_1}$ and $R_{L\_X\_2}$. Therefore, the secondary inductor $L_S$, the leakage inductor $L_{K2\_X}$, and the capacitors $C_{S2\_X\_1}$ and $C_{S2\_X\_2}$ form an output resonant tank 202 that is coupled between ground and a node 204 having a voltage $V_{SENSE}$. Accordingly, the output resonant current $I_{OUT\_X}$ can oscillate as an AC current through each of the loads $R_{L\_X\_1}$ and $R_{L\_X\_2}$. It is to be understood that the output stage 162 can include any number of parallel capacitor/load current paths for the output current $I_{OUT\_X}$, and is thus not limited to two as demonstrated in the example of FIG. 5.

Referring back to the example of FIG. 4, the LLC resonant power regulator system 150 includes a sense resistor $R_{SENSE}$ that is coupled between the node 204 that is coupled to each of the output stages 162 and ground. As an example, the sense resistor $R_{SENSE}$ can have a relatively small resistor magnitude (e.g., 100 ohms). As described above, the node 204 has a voltage potential of $V_{SENSE}$. Therefore, the voltage $V_{SENSE}$ can correspond to a current magnitude that is an aggregate magnitude of each of the output resonant currents $I_{OUT\_X}$. The voltage $V_{SENSE}$ can be provided to a feedback controller, such as the feedback controller 28 in the example of FIG. 1. Accordingly, the voltage $V_{SENSE}$ can be monitored to regulate the frequency of the switching signals $SW_1$ and $SW_2$, similar to as described above in the example of FIG. 1.

The example of FIGS. 4 and 5 therefore demonstrate a manner in which the LLC resonant power regulator system 150 can provide power to a plurality of loads, such as a plurality of CCFLs. Because the switching signals $SW_1$ and $SW_2$ can be generated with a fixed duty-cycle of approximately 50% and to within a narrow sweeping frequency range that is greater than one or both of the resonant frequencies of the input resonant tank 158, the LLC resonant power regulator system 150 can be operated with substantially greater efficiency and with substantially less THD than typical resonant power regulators. It is to be understood that the LLC resonant power regulator system 150 is not intended to be limited to the examples of FIGS. 4 and 5. For example, the LLC resonant power regulator system 150 can implement alternative ways to monitor the output currents $I_{OUT\_X}$ to regulate the frequency of the switching signals $SW_1$ and $SW_2$. As another example, the LLC resonant power regulator system 150 can be configured with any of a variety of combinations of output stages 162 and corresponding loads RL_X therein.

Figure 6:
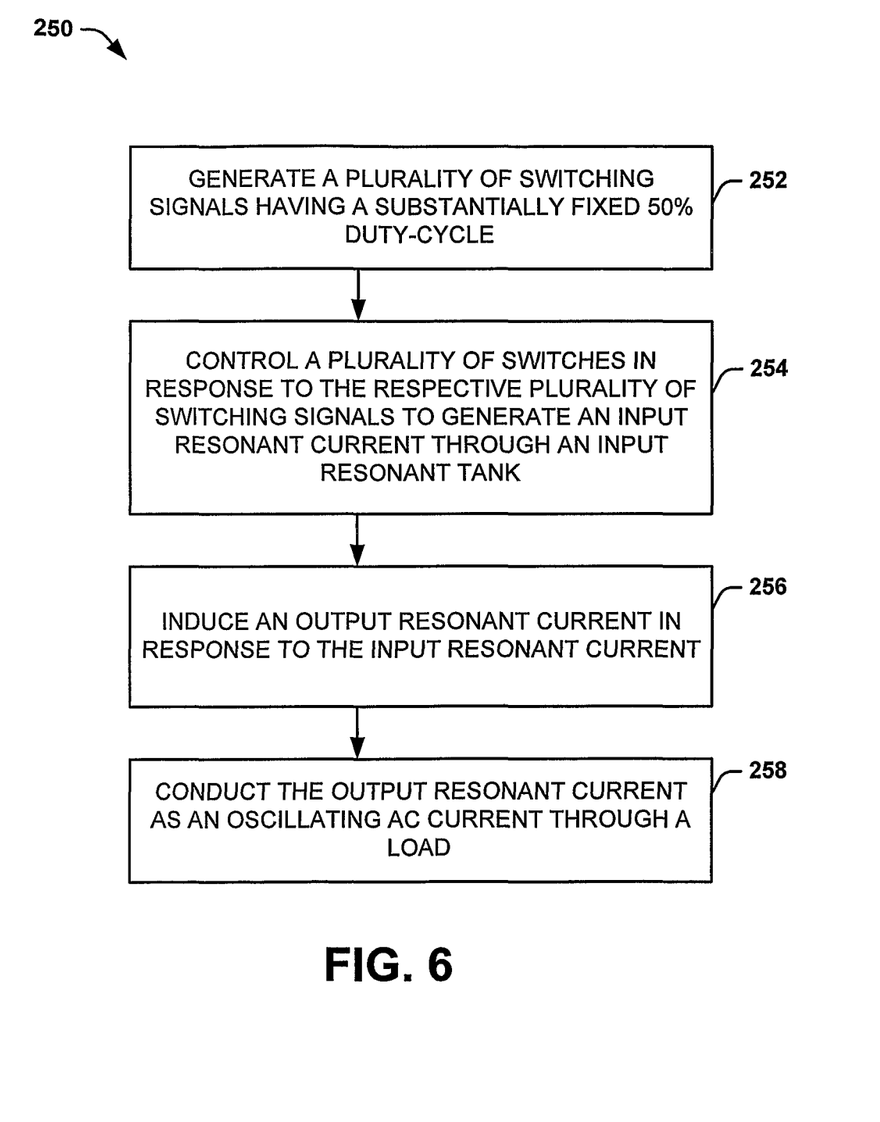
FIG. 6 illustrates an example of a method for providing AC power via an LLC resonant power regulator in accordance with an aspect of the invention.

In view of the foregoing structural and functional features described above, certain methods will be better appreciated with reference to FIG. 6. It is to be understood and appreciated that the illustrated actions, in other embodiments, may occur in different orders and/or concurrently with other actions. Moreover, not all illustrated features may be required to implement a method.

FIG. 6 illustrates an example of a method 250 for providing AC power via an LLC resonant power regulator in accordance with an aspect of the invention. At 252, a plurality of switching signals are generated having a substantially fixed 50% duty-cycle and a sweeping frequency that is maintained within a sweeping frequency range. The switching signals can be generated from a switching control stage, or any of a variety of other types of processing or clock generating components. At 254, a plurality of switches are controlled in response to the respective plurality of switching signals to generate an input resonant current through an input resonant tank comprising an input resonant capacitor, an input leakage inductor, and a primary inductor of a transformer. The switches can be configured as MOSFET switches, and can be configured as a half-bridge having an interconnecting control node that is coupled to provide current relative to the input resonant tank.

At 256, an output resonant current is induced through a secondary inductor of the transformer in response to the input resonant current, the output resonant current resonating through an output resonant tank. The output current can be induced by the magnetic flux that results from the resonant current flow through the primary inductor. The output resonant tank can include an output resonant capacitor, an output leakage inductor, and the secondary inductor of the transformer. The output resonant tank can be implemented as one or more output resonant tanks that are arranged in each of a plurality of respective output stages, such that each of the output stages includes a transformer that induces the output resonant current in response to the input resonant current. At 258, the output resonant current is conducted as an oscillating AC current through a load which is coupled in series with the output resonant tank. The load can be a CCFL, and can be one of a plurality of loads through which the output resonant current flows.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:
1. An LLC resonant power regulator system comprising:
a transformer comprising a primary inductor and a secondary inductor;
an input resonant tank comprising an input resonant capacitor, an input leakage inductor, and the primary inductor connected in series having a first resonant frequency defined by the leakage inductor and the resonant capacitor and having a second resonant frequency defined by the leakage inductor, a magnetizing inductor and the resonant capacitor;
an input stage comprising a plurality of switches that are controlled in response to a respective plurality of switching signals sweeping frequency to supply an input resonant current to the input resonant tank, each of the respective plurality of switching signals having a fixed duty cycle and a sweeping frequency greater than at least one of the first or the second resonant frequency of the tank; and an output resonant tank comprising an output resonant capacitor, an output leakage inductor, and the secondary inductor connected in series, the output resonant tank being configured to generate an oscillating output resonant current in a load connected at an output.

2. The system of claim 1, further comprising a feedback controller configured to provide an AC feedback signal depending on a difference between the AC output resonant current and a predetermined reference.

3. The system of claim 2, further comprising a switch control stage configured to provide the plurality of switching signals and to regulate the sweeping frequency of the plurality of switching signals within a sweeping frequency range in response to the feedback signal, the sweeping frequency range being between the first resonant frequency and the second resonant frequency that is greater than the first frequency.

4. The system of claim 3,
wherein the switch control stage is further configured to set the first frequency of the sweeping frequency range to be greater than at least one of the first resonant frequency and the second resonant frequency to maintain zero voltage switching (ZVS) control of the plurality of switches.

5. The system of claim 3, wherein the switch control stage is configured to set the fixed duty-cycle for each of the plurality of switching signals at approximately 50%.

6. The system of claim 1, wherein the plurality of switches comprises a first switch and a second switch that are arranged as a half-bridge between an input voltage and a second voltage, the half-bridge comprising an interconnecting node that is coupled to the input resonant tank.

7. The system of claim 6, wherein the first switch is controlled by a first switching signal and the second switch is controlled by a second switching signal, the first and second switching signals each having an approximately 50% duty-cycle and being approximately 180° out-of-phase relative to each other.

8. The system of claim 1, further comprising a plurality of output stages, each of the plurality of output stages comprising resonant circuitry that includes an output stage resonant tank, the sweeping frequency being controlled to regulate the output resonant current in each respective output stage resonant tank.

9. The system of claim 1, wherein the input resonant tank further comprises at least one additional inductor connected in series with the input resonant capacitor, the input leakage inductor, and the primary inductor.

10. The system of claim 1, further comprising a cold cathode fluorescent lamp (CCFL) connected at the output of the output resonant tank.

11. An LLC resonant power regulator system comprising:
a transformer comprising a primary inductor and a secondary inductor;
an input resonant tank comprising an input resonant capacitor, an input leakage inductor, and the primary inductor connected in series;
an input stage comprising a plurality of switches that are controlled in response to a respective plurality of switching signals sweeping frequency to supply an input resonant current to the input resonant tank, each of the respective plurality of switching signals having a fixed duty cycle and a sweeping frequency;
an output resonant tank comprising an output resonant capacitor, an output leakage inductor, and the secondary inductor connected in series, the output resonant tank being configured to generate an oscillating output resonant current at an output, further comprising a plurality of output stages, each of the plurality of output stages comprising resonant circuitry that includes an output stage resonant tank, the sweeping frequency being controlled to regulate the output resonant current in each respective output stage resonant tank, wherein the transformer is configured to generate an intermediate current at the secondary inductor thereof in response to the input resonant current through the primary inductor thereof, and wherein each of the plurality of output stages further comprises:
an output stage transformer comprising an output primary inductor inductively coupled with an output secondary inductor, the output primary inductor conducting the intermediate current therethrough to induce a corresponding output stage resonant current through the output secondary inductor; and
the resonant circuitry comprising the output secondary inductor of the output stage transformer, the output leakage inductor of the output stage transformer, and at least one output resonant capacitor connected in series with a respective load, the corresponding output resonant current oscillating through the resonant circuitry to the respective load connected in series with the at least one resonant capacitor.

12. A method for providing AC power via an LLC resonant power regulator, the method comprising:
generating a plurality of switching signals having a substantially fixed 50% duty-cycle and a sweeping frequency;
controlling a plurality of switches in response to the respective plurality of switching signals to provide an input resonant current to an input resonant tank, the input resonant tank comprising an input resonant capacitor, an input leakage inductor, and a primary inductor of a transformer; having a first resonant frequency defined by the leakage inductor and the resonant capacitor and having a second resonant frequency defined by the leakage inductor, a magnetizing inductor and the resonant capacitor and having a sweeping frequency greater than at least one of the first or the second resonant frequency of the tank;
inducing an output resonant current through a secondary inductor of the transformer in response to the input resonant current, the output resonant current resonating through an output resonant tank that includes the secondary inductor of the transformer; and
conducting the output resonant current as an AC current through a load, the load being coupled in series with the output resonant tank.

13. The method of claim 12, further comprising:
sensing a magnitude of the output resonant current to provide a sensor signal indicative of a magnitude of the output resonant current;
comparing the sensor signal with a predetermined reference to provide a feedback signal; and
regulating a frequency of the plurality of switching signals to within a sweeping frequency range associated with the sweeping frequency in response to the feedback signal.

14. The method of claim 13, wherein regulating the frequency comprises:
setting the sweeping frequency range to be between the first resonant frequency and the second resonant frequency that is greater than the first frequency; and
setting the first resonant frequency to be greater than at least one of a first resonant frequency that is based on the input resonant capacitor and the input leakage inductor and a second resonant frequency that is based on the input resonant capacitor, the input leakage inductor, and the primary inductor to deactivate the plurality of switches in a zero voltage switching (ZVS) manner.

15. The method of claim 12, wherein generating the plurality of switching signals comprises generating a first switching signal and a second switching signal, the first and second switching signals being approximately 180° out-of-phase relative to each other, and wherein controlling the plurality of switches comprises:
controlling a first switch in response to the first switching signal; and
controlling a second switch in response to the second switching signal, the first and second switch being configured as a half-bridge between an input voltage and a second voltage, the half-bridge having an interconnecting node that is coupled to provide the input resonant current to the input resonant tank.

16. The method of claim 12, wherein inducing the output resonant current further comprises inducing an output resonant current through an output secondary inductor of each of a plurality of output stage transformers in response to the input resonant current, the output resonant current resonating through each of a respective plurality of output resonant circuits, each of which includes the respective output secondary inductor.

17. The method of claim 16, wherein conducting the output resonant current comprises conducting the output resonant current as an AC current through each of a plurality of loads connected with each of the plurality output resonant circuits, each of the plurality of loads being coupled in series with a respective resonant capacitor that is coupled with the respective output secondary inductor of a respective one of the plurality of output resonant circuits.

18. A method for providing AC power via an LLC resonant power regulator, the method comprising:

generating a plurality of switching signals having a substantially fixed 50% duty-cycle and a sweeping frequency;
controlling a plurality of switches in response to the respective plurality of switching signals to provide an input resonant current to an input resonant tank, the input resonant tank comprising an input resonant capacitor, an input leakage inductor, and a primary inductor of a transformer;
inducing an output resonant current through a secondary inductor of the transformer in response to the input resonant current, the output resonant current resonating through an output resonant tank that includes the secondary inductor of the transformer; and
conducting the output resonant current as an AC current through a load, the load being coupled in series with the output resonant tank, wherein inducing the output resonant current further comprises inducing an output resonant current through an output secondary inductor of each of a plurality of output stage transformers in response to the input resonant current, the output resonant current resonating through each of a respective plurality of output resonant circuits, each of which includes the respective output secondary inductor and wherein inducing the output resonant current further comprises:
generating an intermediate current at the secondary inductor of the transformer in response to the input resonant current;
providing the intermediate current to each of a plurality of output primary inductors associated with the respective plurality of output stage transformers; and
inducing the output resonant current through the output secondary inductor of each of the plurality of output stage transformers in response to the intermediate current.

* * * * *